United States Patent [19]

Efner

[11] Patent Number: 5,091,457

[45] Date of Patent: * Feb. 25, 1992

[54] POLYETHYLENE TEREPHTHALATE MOLDING COMPOSITIONS

[75] Inventor: Howard F. Efner, Bartlesville, Okla.

[73] Assignee: Phillips Petroleum Company, Bartlesville, Okla.

[*] Notice: The portion of the term of this patent subsequent to Aug. 20, 2008 has been disclaimed.

[21] Appl. No.: 515,294

[22] Filed: Apr. 27, 1990

[51] Int. Cl.$^5$ ................................................ C08K 7/14
[52] U.S. Cl. ..................................... 524/394; 524/409; 524/410; 524/513
[58] Field of Search ................. 524/394, 513, 409, 410

[56] References Cited

U.S. PATENT DOCUMENTS

| | | | |
|---|---|---|---|
| 4,141,882 | 2/1979 | Kodama et al. | 260/40 R |
| 4,222,928 | 9/1980 | Kawamura et al. | 260/40 R |
| 4,244,859 | 1/1981 | Sugie et al. | 260/40 R |
| 4,506,043 | 3/1985 | Ogawa et al. | 523/523 |
| 4,983,660 | 1/1991 | Yoshida et al. | 524/513 |

*Primary Examiner*—Kriellion S. Morgan
*Assistant Examiner*—Edward J. Cain
*Attorney, Agent, or Firm*—Morrison Bennett

[57] ABSTRACT

Glass fiber reinforced polyethylene terephthalate molding resin compounds with low warpage and increased spiral flow which crystallize rapidly after being injection molded and which have engineering resin performance characteristics are provided. In addition to polyethylene terephthalate and glass fibers, the compounds contain glass flakes, an aliphatic polyester, an ionic hydrocarbon polymer, an antioxidant, and, optionally, polyethylene and/or a polymeric epoxy compound. Sodium stearate and/or polyester amide resins may also be added to improve surface finish. The compounds can be flame retarded with a brominated polystyrene and an antimonate without substantial loss of, or change in, properties.

26 Claims, No Drawings

POLYETHYLENE TEREPHTHALATE MOLDING COMPOSITIONS

BACKGROUND OF THE INVENTION

This invention is in the field of glass fiber reinforced polyethylene terephthalate molding compounds.

Polyethylene terephthalate molding compounds which are reinforced with glass fibers, asbestos fibers, or other fibrous mineral material are known, as are polyethylene terephthalate blends which are able to crystallize relatively rapidly (as desired) after being injection molded into the typical water cooled molds employed in the injection molding industry (which attain surface mold temperature ranging from about 85° to 100° C.). Oil cooled molds, which have higher mold surface temperatures, may, of course, be used if desired.

Objects molded of polyethylene terephthalate compounds filled with glass fibers have varying degrees of warpage due to differential shrinkage once the objects are removed from the molds.

It is difficult to get fiber reinforced polyethylene terephthalate molding blends with a combination of acceptably high, from a commercial viewpoint, thermal and mechanical properties which also have low warpage. Thus, even when a particular polyethylene terephthalate molding compound displays both good surface finish and crystallization characteristics and, after injection molding, some good strength characteristics, it may not be suitable for use in many molding resin blend applications, because of excessive warpage. For example, for use in so called engineering resin applications, a glass fiber reinforced polyethylene terephthalate molding compound needs to have good spiral flow, rapid crystallization, high heat distortion temperature, and an ability to produce a molded part which has a smooth, glossy surface and minimal warpage after the part is removed from a mold.

A fiber reinforced polyethylene terephthalate resin compound intended for engineering resin applications and which accordingly has a commercially acceptable combination of desirable physical and chemical properties should also be capable of having a flame retardant material added thereto in an amount effective for achieving flame retardancy without a significant or commercially unacceptable loss of properties.

There is a need in the art for reinforced polyethylene terephthalate molding compounds with low warpage and high flow characteristics under molding conditions, which also have engineering resin performance characteristics. Also, there is a need in the art for compounds of this type which display high flow rates under molding conditions without water addition and without lubricant addition. In addition, it would be desirable for such blends to have the capacity to be flame retarded to an acceptable extent by the admixture therewith of flame retardant(s) without excessive loss of performance characteristics.

SUMMARY OF THE INVENTION

An object of the present invention is to provide a new and improved class of glass fiber reinforced polyethylene terephthalate compositions which have an excellent combination of low warpage, good spiral flow, good surface finish, rapid crystallization, physical strength, heat distortion temperatures and molding window temperatures.

Another object is to provide such a composition which can be easily and reliably prepared by melt extrusion.

Another object is to provide a fiber glass reinforced polyethylene terephthalate molding composition which has low warpage, good spiral flow, good surface finish, engineering resin performance characteristics, and which is rapidly crystallizable.

Another object is to provide such a composition which can be molded by a conventional procedure with conventional equipment and still obtain engineering resin performance characteristics with low warpage, good spiral flow, rapid crystallization and good surface finish.

Another object is to provide such a composition which can be flame retarded through the addition thereto of further additives which when so added do not cause a significant reduction in desired properties.

Another object is to provide processes for making and using such a fire retarded composition.

Another object is to provide processes for making and using such a composition.

In accordance with this invention, a composition comprises;

(a) from about 20 to about 90 weight percent based on total weight of the composition of polyethylene terephthalate having an inherent viscosity of at least about 0.25;

(b) from about 5 to about 65 weight percent, based on the total weight of the composition, of a filler with the filler comprising a mixture of flake glass and fiber glass having a ratio of flake glass to fiber glass from about 10:1 to about 1:10;

(c) from about 0.5 to about 15 pph resin of a polyester having a number average molecular weight in the range from about 7,500 to about 20,000 and which is a condensation product of a dialkanoic acid containing from about 8 to 12 carbon atoms per molecule and a dialkanol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium; and (e) from about 0.01 to about 2 pph resin of an antioxidant.

DETAILED DESCRIPTION OF THE INVENTION

The composition of this invention demonstrates the normally incompatible characteristics of high flow, low warpage and good mechanical properties as a result of the combination of a dialkanoic acid condensation product and an ionic copolymer in the context of a glass fiber/glass flake reinforced composition.

The present invention is directed to a class of new and very useful molding compounds of glass fiber reinforced polyethylene terephthalate which has a surprising and unexpectedly good spiral flow rate and low warpage as well as a rapid crystallization rate after being injection molded, smooth and glossy surface finish and acceptable engineering resin performance characteristics, such as physical strength, heat distortion, and molding window.

Having low warpage in combination with high flow under molding conditions with good physical properties and rapid crystallization is useful for production of intricate precision parts such as electrical connectors where the mold may contain sections that are difficult to fill.

Among other advantages, a high molding flow rate permits an injected resin to fill all cavities of an intricate mold, as those skilled in the art will readily appreciate. A blended, melt extruded, pelletized composition of this invention can be conventionally injection molded, for example, using an injection molding temperature with range from about 520° to 580° F. into molds typically ranging in surface temperature from about 180° to about 280° F.

In addition, the molding compounds of this invention retain to an unexpected and remarkable extent such an acceptable combination of performance characteristics when a selected class of glass flakes are included in the compound. This achievement is particularly unexpected because while glass flakes are known to reduce warpage and make some small improvements in flow characteristics, the overall performance of flow properties under molding conditions of the inventive compound are superior to a commercially available fiber glass/flake glass molding composition without causing a significant and unacceptable deterioration of the polyethylene terephthalate matrix resin or compromising rapid crystallization.

Although the molding compounds of this invention use a plurality of additives in combination with polyethylene terephthalate, these additives coact with each other and with the polyethylene terephthalate as demonstrated by the circumstance that the above indicated desired combination of engineering resin performance characteristics is not achieved unless all such components are present within the respective quantity ranges taught.

Optionally, additives such as polyethylene or polymeric epoxy compounds can be compounded with a blend of this invention to improve further the impact strength properties of a product molded body made from an extruded molding resin compound of this invention.

More particularly, the molding resin compounds of this invention are compositions comprising (on a 100 weight percent total basis):

(a) from about 20 to about 90 weight percent of polyethylene terephthalate having an intrinsic viscosity of at least about 0.25;

(b) from about 5 to about 65 weight percent of filler with the filler comprising a mixture of flake glass and fiber glass having a ratio of flake glass to fiber glass from about 10:1 to about 1:10;

(c) from about 0.5 to about 15 pph resin of aliphatic polyester having a number average molecular weight ranging from about 7,500 to about 20,000 and which is a condensation product of a dialkanoic acid containing from about 8 to about 12 carbon atoms per molecule and a dialkanol containing from 2 to about 5 carbon atoms per molecule;

(d) from about 0.1 to about 3 pph resin of a metal salt of an ionic hydrocarbon copolymer of an alpha-olefin containing from 2 to 5 carbon atoms per molecule in which copolymer the carboxyl groups have been at least partially neutralized with cations of said metal, said polymer having a molecular weight before such neutralization of at least about 3,000, said metal being selected from the group consisting of sodium and potassium; and (e) from about 0.01 to about 2 pph resin of an antioxidant.

By "pph resin" as used herein is meant the parts by weight per 100 parts by weight of polyethylene terephthalate.

Preferably, the thus-described compound consists essentially of ingredients (a)-(e). More preferably, the compound may additionally contain flame retardants.

To flame retard a compound of this invention, one can admix therewith from greater than 0 to about 50 pph resin, more preferably from about 10 to about 50 pph resin, and most preferably from about 25 to about 35 pph resin, of a composition consisting essentially of:

(a) brominated polystyrene having a number average molecular weight ranging from about 10,000 to about 400,000, and having a bromine content in the range from about 55 to about 75 weight percent (based on total weight of the brominated polystyrene), and (b) antimonate of at least one metal selected from Group I, Group II, and Group VII of the Periodic Table; wherein the weight ratio of said brominated polystyrene to said antimonate ranges from about 1:1 to about 20:1, more preferably from about 6:1 to about 12:1, and most preferably about 9:1.

It is contemplated that other flame retardants also can be used in the inventive compound.

Optionally, to get improved surface finish and good part gloss, from about 0.01 to about 1.0 pph resin, more preferably from about 0.1 to about 0.5 pph resin, of sodium stearate and from about 0.1 to about 5 pph resin, more preferably 0.5 to about 2 pph resin, of a polyester amide resin can be added.

The Polyethylene Terephthalate

The polyethylene terephthalate employed herein has an inherent viscosity of at least about 0.25, preferably about 0.4 as measured by ASTM D-2857. The polyethylene terephthalate perferably has an upper limit on inherent viscosity of about 1.2, and thus the viscosity is generally in the range of 0.25 to 1.2. Inherent viscosity is measured in a 3:1 volume ratio of methylene chloride and trifluoracetic acid at 30° C. The polyethylene terephthalate can optionally contain up to 50 percent by weight of other comonomers, such as diethylene glycol, glutaric acid, polybutylene terephthalate, polyalkylene oxide, cyclohexane dimethanol, and other diols. Mixtures of polyethylene terephthalate resins can be used. Suitable polyethylene terephthalate polymers are commercially available.

The Glass Fibers

The glass fibers have an average cross-sectional thickness in the range from about 7 to 15 microns, preferably about 8 to about 10 microns and an average length in the range from 2 to about 8 millimeters, preferably about 2.5 to about 5 millimeters. Such glass fibers are commercially available.

The Glass Flakes

The glass flakes are thin glass flakes from about 50 microns to about 4500 microns average particle size as sieved which have been hammer milled through a designated screen size. The surface of the glass flakes can be chemically modified. A range of particle sizes can be used with a commercially available ⅛" or 1/64" diameter flake glass being preferred. More preferred are glass flakes of greater than 1/32" diameter. The glass flakes are relatively rigid and thus a 1000 micron flake, for instance, requires about a 1000 micron diameter screen opening to pass through. Also as the following table demonstrates, nominal ⅛ inch flakes, for instance, demonstrate some distribution in size with a trace not going through a 12 mesh screen and 20.5 percent going through a 70 mesh screen.

TABLE 1

| Typical Nominal Screen Analysis of Commercially Available Flake Glass | | |
|---|---|---|
| Screen # | ⅛" Flake | 1/64" Flake |
| 12 | trace | — |
| 20 | 9.1 | — |
| 40 | 33.3 | 0.5 |
| 70 | 33.8 | 21.0 |
| pan | 20.5 | 76.7 |

The Polyester

The polyesters have a number average molecular weight in the range from about 7,500 to about 20,000, preferably about 8,000 to about 10,000, which is a condensation product of a dialkanolic acid containing from about 8 to 12 carbon atoms per molecule and a dialkanol containing from about 2 to about 5 carbon atoms per molecule. Preferred dialkanoic acid comonomers for such polyesters contain 8 to 10 carbon atoms per molecule and preferred dialkanol comonomers for such polyesters contain 3 to 4 carbon atoms per molecule. One presently most preferred such polyester is a condensation product of sebacic acid with 1,2 propanediol. Characteristically, the polyester is in the physical form of a liquid at ambient conditions. It is believed that the polyester reacts with the resin matrix during extrusion processing conditions.

The Ionic Hydrocarbon Copolymer

The ionic hydrocarbon copolymer is a metal salt of an ionic hydrocarbon copolymer of an alpha-olefin containing from about 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, with the copolymer having a number average molecular weight in excess of about 3,000 prior to neutralization, and the metal is selected from the group consisting of sodium and potassium.

Presently preferred representatives of the ionic hydrocarbon copolymer are sodium and/or potassium salts of copolymers of such olefins (especially ethylene) with acrylic acid, methacrylic acid, or mixtures thereof which are at least about 30 percent neutralized. Suitable polymers are commercially available.

The polyester and the ionic hydrocarbon copolymer (also referred to as the ethylene acid copolymer or ionomer) are believed to cooperate with one another in a synergistic manner when in combination with poly- ethylene terephthalate to induce rapid crystallization of the polyethylene terephthalate when such combination is melt injected into a mold having a surface temperature at about or under 110° C., and to result in good molded product properties. Typical crystallization times with such a mold temperature are characteristically not more than about 30 seconds.

The Antioxidant

Many different antioxidants can be used. In general, preferred antioxidants are thermally stable at the processing temperature employed. Hindered phenol antioxidants are presently preferred. The antioxidant which is presently most preferred is available from Ciba-Geigy Corporation as "Irganox 1010", the active component of which is believed to be tetrakis (methylene 3-[3,5-di-t-butyl-4-hydroxyphenyl]propionate) methane. Other suitable antioxidants include:

(A) Borg Warner's "Ultranox 626", the active agent of which is bis[2,4-di-t-butyl phenyl pentaerythritol]diphosphite;

(B) Ciba-Geigy's "Irganox 259", the active agent of which is 1,6-hexamethylene bis(3,5-di-t-butyl-4-hydroxy-hydrocinnamate) and/or 1,6-hexamethylene bis(3-[3,5-di-t-butyl-4-hydroxyphenyl]-propionate);

(C) Ferro Corporation's "OXI-Chek 116", the active agent of which is octadecyl 3,5-di-t-butyl-4-hydroxyhydrocinnamate; and (D) Ciba-Geigy's "Irganox 1098", the active agent of which is n,n'-hexamethylene bis[3,5-di-t-butyl-4-hydroxyhydrocinnamide].

The Sodium Stearate

The sodium stearate contemplated as useful herein is a salt of stearic acid. It is available commercially, usually in the form of powder or pellets.

The Polyester Amide

The polyester amides which can be employed herein are substantially linear, segmented, and contain aromatic residues in the hard segments, but still possess sufficiently low melt properties to be injection moldable. Polyester amides contemplated as useful in this invention are those which are characterized by a recurring unit of the formula:

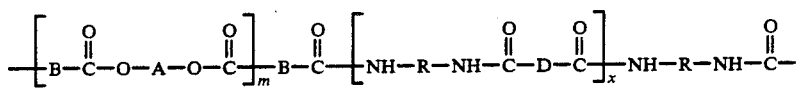

wherein R is selected from the class consisting of arylene of the formulae:

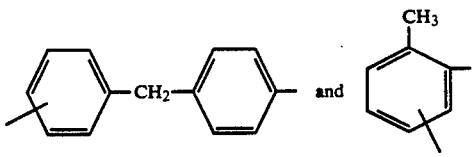

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, isophthalic and terephthalic acids, m has a mean value of less than 1 and greater than 0, D is the residue of a dicarboxylic acid HOOC—D—COOH such that the melt temperature of the hard segment is not greater than 280° C., and x is a number having an average value from zero to 10.

The Brominated Polystyrene

Preferably, the bromine content is at least about 60 weight percent of such polymer. Preferably, such polymer has a number average molecular weight ranging from about 10,000 to about 400,000, preferably about 225,000 to about 350,000. Such brominated polystyrene is available commercially.

For purposes of achieving flame retardancy, the combined weight of the brominated polystyrene and the antimonate (see below) in a resin blend is preferably at least about 4 weight percent of the total resin blend. A presently preferred weight ratio of brominated polystyrene to antimonate compound(s) is from about 1:1 to about 20:1, more preferably, from about 6:1 to about 12:1, and most preferably about 9:1.

The Antimonate

A presently particularly preferred antimonate is sodium antimonate although zinc antimonate and nickel antimonate and mixtures thereof are also preferred. The antimonate is usually employed in a finely-divided particulate or powder form.

Other Additives

In addition to the components discussed herein, the compounds of the invention may contain other additives commonly employed (and in the quantities known to the art) with polyethylene terephthalate, such as, for example, colorants, mold release agents, tougheners, heat and ultraviolet light stabilizers, fillers, and the like. Usually, the total quantity of such other additives is not more than about 20 weight percent of the total weight of the composition, including ingredients (a) through (e) listed above, although higher amounts could be used if desired.

Preparation

The compound compositions are prepared by blending together the components by any convenient means. For example, dry polyethylene terephthalate can be dry mixed in any suitable blender or tumbling means with the other components and the resulting mixture melt-extruded. Preferably, the polyester is preblended with the glass fibers and then this mixture is itself dry mixed with the other additives before melt-extrusion. A convenient melt extrusion temperature ranges from about 520° to 580° F. (282° to 304° C.). The extrudate is preferably in a strand form which can be chopped into pellets or the like as desired.

Composition

The molding resin compound compositions of this invention are summarized by the following Table 2:

TABLE 2

| I.D. No. | Component | Quantity Broad Range | Quantity Preferred Range |
|---|---|---|---|
| 1. | Polyethylene Terephthalate, wt %[a] | 20–90 | 26–78 |
| 2. | Filler, wt %[a] | 5–65 | 10–60 |
|  | Glass Flakes:Glass Fibers | 10:1–1:10[b] | 1:2[c] |
| 3. | Polyester, pph resin | 0.5–15 | 2.5–10.0 |
| 4. | Ionic Hydrocarbon Copolymer, pph resin | 0.1–3 | 0.2–1.2 |
| 5. | Antioxidant, pph resin | 0.01–2 | 0.2–1.0 |
| 6. | Sodium Stearate,[d] pph resin | 0.01–1.0 | 0.1–0.5 |
| 7. | Polyester Amide Resin,[e] pph resin | 0.1–5 | 0.5–2 |
| 8. | Flame Retardant,[f,g] pph resin | 10–50 | 25–35 |

[a]Based on total weight of the composition.
[b]Range of ratio by weight of flakes to fibers.
[c]Ratio by weight of flakes to fibers.
[d]Optional.
[e]Optional.
[f]Weight ratio of brominated polystyrene to metal antimonate is from about 1:1 to about 20:1, more preferably from about 6:1 to about 12:1.
[g]Optional.

EXAMPLES

The following examples will be used to describe the invention and should be taken as illustrative and not restrictive.

Components and Test Results

Thirteen runs were made using the various combinations and amounts of ingredients shown in the following Table 3. Results of tests of properties of the compounds of each of these runs and of two control compounds are also shown in Table 3.

Compounding

The polyethylene terephthalate resin was vacuum dried overnight at 250° F. to compounding. Other dessicant or dehumidifing drying methods are acceptable. The dry resin was tumble blended with the other ingredients prior to compounding in a 1.5 inch 24:1 1/d single screw extruder at a melt temperature range of about 520° to 540° F. Alternatively, the polyester can be premixed with the glass fibers before mixing the polyester and glass mixture with the other components. The melt was stranded, cooled, and pelletized into approximately ⅛ inch pellets. A nitrogen blanket was used to protect the polyethylene terephthalate resin from moisture absorption in the feeder or hopper.

Molding

The pelletized compunds were dried overnight in a dehumidifing oven at 225° F. before molding. Standard test parts were molded on a 55-ton hydraulic clamp injection molding press with a mold surface temperature of about 235° F. and a cylinder temperature of about 540 ° F. The dry molding compound was protected from moisture by a dry nitrogen blanket on the machine hopper. A fast injection speed was used with about 5 second injection time, about 4 second hold time, and about 25 second cooling time. Injection pressure was adjusted for moling filling. Holding pressure was about 80% of injection pressure.

Spiral Flow Measurement

Spiral flow measurements were done on a 0.250 in.×0.060 in. spiral flow mold in a 55-ton injection molding machine. Mold surface temperature was about 235° F. and melt temperature was about 540 ° F. A fast injection speed was used with an injection time of about 5 seconds, no holding time, and about 17 seconds cooling time. The average flow length of 10 parts was taken after the machine had stabilized. Measurements were taken at hydraulic pressures of about 500, 1000, and 1500 psi which corresponded to injection pressures of about 6750, 135,00, and 20,250 psi.

General Surface Appearance

Surface appearance was visually rated on test parts molded under the conditions described above. The range was from dull to glossy.

Warpage

Relative part warpage was estimated by visual observation of the flatness of a 2½ in. diameter by 1/16 in. thick impact disc molded under the standard conditions described above.

The results shown in Table 3 show that the invention is operable over a wide range of flake sizes, ratios of flake to fiber and with a variety of additive packages.

Runs 1, 2, 3 and 4 demonstrate that changing flake size does not significantly affect mechanical properties.

Control Run A and Runs 5-8 show that addition of flakes reduces warpage while showing expected drop in mechanical properties.

Runs 9 and 10 showed unexpectedly high spiral flow properties when compared to Run B, the commercially available control, while maintaining comparable physical properties.

Runs 12 and 13 show that other additives can be used with flake glass without compromising the physical properties obtained.

TABLE 3

| | Run 1 | Run 2 | Run 3 | Run 4 | Run 5 | Run 6 | Run 7 | Run 8 |
|---|---|---|---|---|---|---|---|---|
| Ingredients | | | | | | | | |
| Polyethylene Terephthalate Resin | 50.5 | 50.5 | 39 | 39 | 59.6 | 59.6 | 59.6 | 59.6 |
| Fiberous Glass | 30 | 30 | 30 | 30 | 25 | 25 | 27.5 | 27.5 |
| ⅛" Flake Glass | 15 | | 15 | | 10 | | 7.5 | |
| 1/64" Flake Glass | | 15 | | 15 | | 10 | | 7.5 |
| Polyester | 3.5 | 3.5 | 2.9 | 2.9 | 4.2 | 4.2 | 4.2 | 4.2 |
| Ethylene Acid Copolymer | 0.5 | 0.5 | 0.4 | 0.4 | 0.6 | 0.6 | 0.6 | 0.6 |
| Antioxidant | 0.5 | 0.5 | 0.4 | 0.4 | 0.6 | 0.6 | 0.6 | 0.6 |
| Brominated Polystyrene | | | 11.2 | 11.2 | | | | |
| Sodium Antimonate | | | 1.1 | 1.1 | | | | |
| Polyester Amide Elastomer | | | | | | | | |
| Sodium Stearate | | | | | | | | |
| Blue Color Concentrate | | | | | | | | |
| Physical Properties | | | | | | | | |
| Flex Modulus, MSI | 1.9 | 1.9 | 2.1 | 2 | 1.4 | 1.5 | 1.5 | 1.5 |
| Flex Strength, KSI | 28.8 | 32.0 | 22.3 | 23.2 | 27.7 | 30.8 | 30.6 | 31.4 |
| Tensile Strength at Break, KSI | 18.4 | 19.5 | 15.7 | 17.6 | 18.3 | 19 | 19.6 | 20 |
| Percent Elongation | 3.5 | 4.0 | 2.8 | 0.9 | 4.6 | 4.7 | 4.9 | 5 |
| Izod, Notched, ft.lb./in. | 1.2 | 1.5 | 1.1 | 1.1 | 1.5 | 1.5 | 1.6 | 1.6 |
| Unnotched | 11.1 | | 5.8 | | | | | |
| Melt Flow, 275° C., 5 Kg | 39 | 21 | 37 | 39 | 44 | 37 | 30 | 36 |
| Color | Lt Tan | White | Tan | Lt Tan | White | White | White | White |
| Surface | Glossy | VS Dull | Glossy | VS Dull | VS Dull | VS Dull | VS Dull | VS Dull |
| Warpage | Slight | Slight | Nil | Nil | Nil | Nil | Nil | Nil |
| Spiral Flow, 6,750 psi | | | | | | | | |
| in. at 13,500 psi | | | | | | | | |
| 20,250 psi | | | | | | | | |

| | Control A | Control B[a] | Run 9 | Run 10 | Run 11 | Run 12 | Run 13 |
|---|---|---|---|---|---|---|---|
| Ingredients | | | | | | | |
| Polyethylene Terephthalate Resin | 59.6 | | 35 | 35 | 35 | 35 | 35 |
| Fiberous Glass | 35 | | 30 | 30 | 30 | 30 | 30 |
| ⅛" Flake Glass | | | 15 | | | | |
| 1/64" Flake Glass | | | | 15 | 15 | 15 | 15 |
| Polyester | 4.2 | | 2.9 | 2.9 | 2.9 | 2.9 | 2.9 |
| Ethylene Acid Copolymer | 0.6 | | 0.4 | 0.4 | 0.4 | 0.4 | 0.4 |
| Antioxidant | 0.6 | | 0.4 | 0.4 | 0.4 | 0.4 | 0.4 |
| Brominated Polystyrene | | | 11.2 | 11.2 | 11.2 | 11.2 | 11.2 |
| Sodium Antimonate | | | 1.1 | 1.1 | 1.1 | 1.1 | 1.1 |
| Polyester Amide Elastomer | | | | | | 0.2 | 0.4 |
| Sodium Stearate | | | | | | 0.1 | 0.1 |
| Blue Color Concentrate | | | 4 | 4 | 4 | 4 | 4 |
| Physical Properties | | | | | | | |
| Flex Modulus, MSI | 1.6 | 2.1 | 1.9 | 1.9 | 1.9 | 1.8 | 1.8 |
| Flex Strength, KSI | 35.4 | 22 | 22.3 | 24.6 | 23.6 | 22.3 | 23.2 |
| Tensile Strength at Break, KSI | 23.0 | 13.8 | 16.1 | 17.6 | 16.1 | 16.2 | 16.4 |
| Percent Elongation | 5.2 | 0.6 | 2.9 | 3.2 | 2.9 | 3.1 | 3.2 |
| Izod, Notched, ft.lb./in. | 1.7 | 0.8 | 1.0 | 1.0 | 1.0 | 1.0 | 1.0 |
| Unnotched | 19.2 | | 5.9 | 6.3 | 6.2 | 5.6 | 5.3 |
| Melt Flow, 275° C., 5 Kg | 27 | 44 | 47 | 60 | 46 | 39 | 39 |
| Color | Off Wh | Off Wh | Blue | Blue | Blue | Blue | Blue |
| Surface | Sl Dull | Sl Dull | | | VS Dull | VS Dull | VS Dull |
| Warpage | Moderate | Nil | Nil | Nil | | | |
| Spiral Flow, 6,750 psi | | 6½ | 9 | 9 | | | |
| in. at 13,500 psi | | 10 | 14 | 13½ | | | |

TABLE 3-continued

| | Weight Percent Based on Total Weight | | |
|---|---|---|---|
| 20,250 psi | 13 | 18½ | 18¾ |

[a]Control B is Rynite ™ FR946, and injection molding resin commercially available from DuPont. It was not analyzed for content.

While this invention has been described in detail for the purpose of illustration, the inventive composition, processes and articles are not to be construed as limited thereby. This patent is intended to cover all changes and modifications within the spirit and scope thereof.

That which is claimed is:

1. A composition comprising:
   (a) from about 20 to about 90 weight percent, based on total weight of the composition, of polyethelene terephthalate having an inherent viscosity of at least about 0.25;
   (b) from about 5 to about 65 weight percent, based on total weight of the composition, of filler, said filler comprising a mixture of flake glass and fiber glass having a ratio of said flake glass to said fiber glass from about 10:1 to about 1:10;
   (c) from about 0.5 to about 15 pph resin of a polyester having a number average molecular weight in the range from about 7,500 to about 20,000 and which is a condensation product of a dialkanoic acid containing from about 8 to 12 atoms per molecule and a dialkanol containing from 2 to about 5 carbon atoms per molecule;
   (d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium; and
   (e) from about 0.01 to about 2 pph resin of an antioxidant.

2. A composition as recited in claim 1 which additionally contains from about 1 to about 50 pph resin of a flame retardant.

3. A composition as recited in claim 2 wherein said flame retardant consists essentially of:
   (a) brominated polystyrene having a molecular weight ranging from about 10,000 to about 400,000 and having a bromine content in the range of from about 55 to about 75 weight percent based on the total weight of said brominated polystyrene; and
   (b) an antimonate of at least one metal selected from Groups I, II or VII of the Periodic Table, the weight ratio of said brominated polystyrene to said antimonate being in the range from about 1:1 to 20:1.

4. A composition as recited in claim 3 wherein said antimonate is selected from the group consisting of sodium antimonate, zinc antimonate, and nickel antimonate.

5. A composition as recited in claim 4 wherein said antimonate comprises sodium antimonate.

6. A composition as recited in claim 1 wherein said polyester has a molecular weight in the range from about 8,000 to about 10,000 and comprises a condensation product of sebacic acid and 1,2-propanediol.

7. A composition as recited in claim 1 wherein said ionic hydrocarbon copolymer is comprised of ethylene and a carboxylic acid selected from the group consisting of acrylic acid, methacrylic acid, and mixtures thereof.

8. A composition as recited in claim 1 wherein said antioxidant is a hindered phenol.

9. A composition as recited in claim 1 additionally containing from about 0.01 to about 5 pph resin of sodium stearate and from about 0.1 to about 5 pph resin of a polyester amide resin characterized by a recurring unit of the formula:

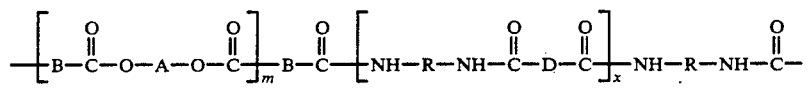

wherein R is selected from the class consisting of arylene of the formulae:

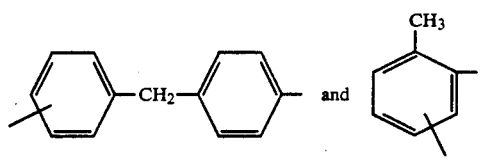

and mixtures thereof, A is the residue of a polymeric diol HO—A—HO having a molecular weight from about 400 to about 4000, B is the residue of a dicarboxylic acid HOOC—B—COOH selected from the class consisting of aliphatic dicarboxylic acid HOOC—B—COOH selected from the class consisting of aliphatic dicarboxylic acids having from 6 to 14 carbon atoms, inclusive, isophthalic and teraphthalic acids, m has a mean value of less than 1 and greater that 0, D is the residue of a dicarboxylic acid HOOC—D—COOH such that the melt temperature of the hard segment is not greater that 280° C., and x is a number having an average value from zero to 10.

10. A composition as in claim 2 additionally containing from about 0.01 to about 5 pph resin of sodium stearate and from about 0.1 to about 5 pph resin of a polyester amide resin characterized by a recurring unit of the formula:

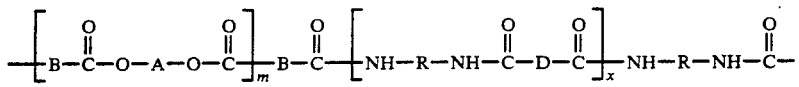

wherein R is selected from the class consisting of arylene of the formulae:

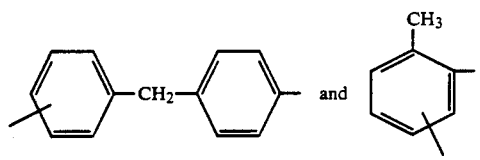

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, isophthalic and terephthalic acids, m has a mean value of less than 1 and greater than 0, D is the residue of a dicarboxylic acid HOOC—D—COOH such that the melt temperature of the hard segment is not greater than 280° C., and x is a number having an average value from zero to 10.

11. A process for preparing a composition comprising:
(a) from about 20 to about 90 weight percent based on total weight of the composition polyethylene terephthalate having an inherent viscosity of at least about 0.25;
(b) from about 5 to about 65 weight percent based on weight of the composition of filler, said filler comprising a mixture of flake glass and fiber glass having a ration of said flake glass to said fiber glass from about 10:1 to about 1:10;
(c) from about 0.5 to about 15 pph resin of a polyester having a number average molecular weiht in the range from about 7,500 to about 20,000 and which is a condensation product of a dialkanoic acid containing from about 8 to 12 atoms per molecule and a dialkanol containing from 2 to about 5 carbon atoms per molecule;
(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecule weight in excess of about 3,000 prior to neutralization, said metal being selected from the group consisting of sodium and potassium; and
(e) from about 0.01 to about 2 pph resin of an antioxidant; said process comprising mixing components (a) through (e) and melt-extruding the mixture.

12. A process as recited in claim 11 wherein said polyester is premixed with said glass fibers before the resulting mixture is admixed with the remaining components.

13. A process for preparing a composition as recited in claim 12 further having from about 1 to about 50 pph resin of a flame retardant said process comprising mixing the components of said blend and melt-extruding the mixture.

14. A process as recited in claim 13 wherein said polyester is premixed with said glass fibers before the resulting mixture is admixed with the remaining components.

15. A process for preparing a composition as recited in claim 13 wherein said flame retardant consists essentially of:
(a) brominated polystyrene having a molecular weight ranging from about 10,000 to about 400,000 and having a bromine content in the range of from about 55 to about 75 weight percent based on the total weight of said brominated polystyrene; and
(b) an antimonate of at least one metal selected from Groups I, II or VII of the Periodic Table, the weight ratio of said brominated polystyrene to said antimonate being in the range from about 1:1 to 20:1;
said process comprising mixing the components of said blend and melt-extruding the mixture.

16. A process as recited in claim 15 wherein said polyester is premixed with said glass fibers before the resulting mixture is admixed with the remaining components.

17. A process for preparing a composition as recited in claim 15 wherein said antimonate is slected from the group consisting of sodium antimonate, zinc antimonate, and nickel antimonate; said process conprising mixing the components of said blend and melt-extruding the mixture.

18. A process as recited in claim 17 wherein said polyester is premixed with said glass fibers befor the resulting mixture is admixed with the remaining components.

19. A process for making a molded article which comprises injecting into a mold composition comprising:
(a) from about 20 to about 90 weight percent based on total weight of the composition polyethylene terephthalate having an inherent viscosity of at least about 0.25;
(b) from about 5 to about 65 weight percent based on weight of the composition of filler, said filler comprising a mixture of flake glass and fiber glass having a ratio of said flake glass to said fiber glass from about 10:1 to about 1:10;
(c) from about 0.5 to about 15 pph resin of a polyester having a number average molecular weight in the range from about 7,500 to about 20,000 and which is a condensation product of a dialkanoic acid containing from about 8 to 12 atoms per molecule and a dialkanol containing from 2 to about 5 carbon atoms per molecule;
(d) from about 0.1 to about 3 pph resin of a metal salt of an ionic hydrocarbon copolymer of an alph-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium; and (e) from about 0.01 to about 2 pph resin on an antioxidant.

20. A process as recited in claim 19 wherein said composition further contains from about 1 to about 50 pph resin of a flame retardant.

21. A process as recited in claim 20 wherein said flame retardant consists essentially of:

(a) brominated polystyrene having a molecular weight ranging from about 10,000 to about 400,000 and having a bromine content in the range of from about 55 to about 75 weight percent based on the total weight of said brominated polystyrene; and (b) an antimonate of at least one metal selected from Groups I, II or VII of the Periodic Table, the weight ratio of said brominated polystyrene to said antimonate being in the range from about 1:1 to 20:1.

22. A process as recited in claim 21 wherein said antimonate is selected from the group consisting of sodium antimonate, zinc antimonate and nickel antimonate.

23. A molded article produced by the process of claim 19.

24. A molded article produced by the process of claim 20.

25. A molded article produced by the process of claim 21.

26. A molded article produced by the process of claim 22.

* * * * *